May 1, 1951 N. J. NEBOUT 2,551,038
TIRE VALVE
Filed Dec. 27, 1948
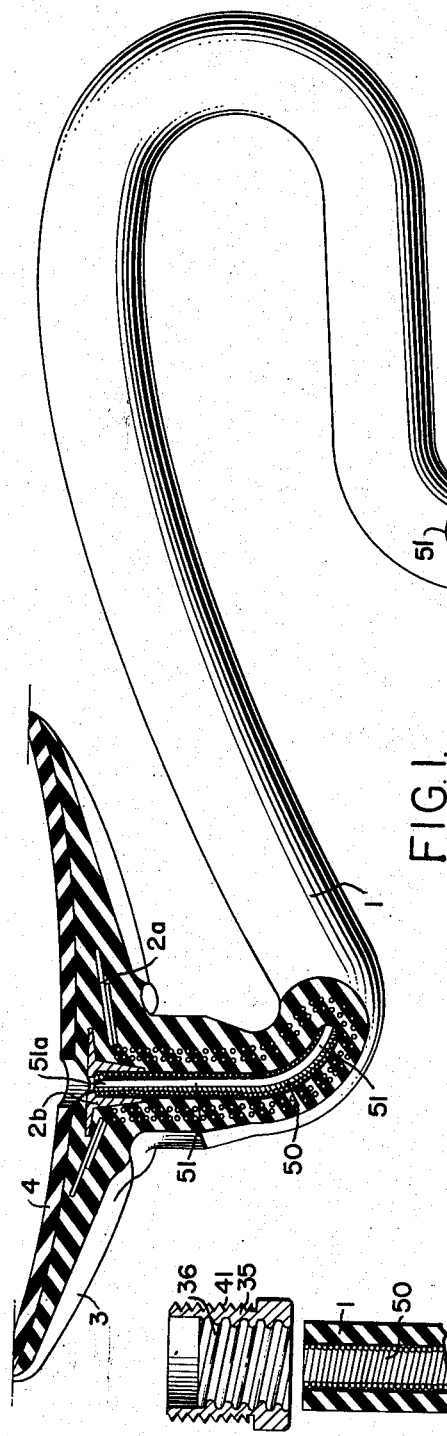
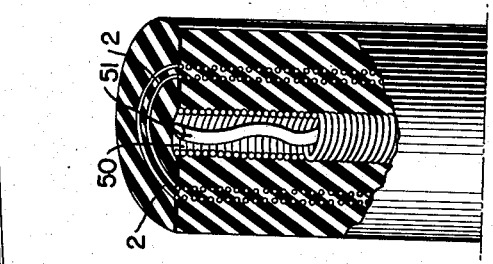
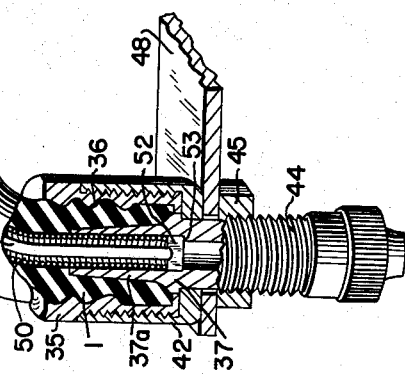
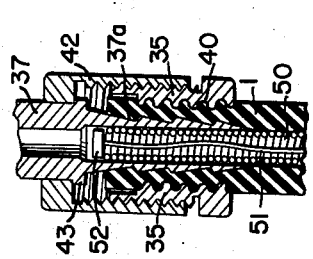
INVENTOR
NOEL J. NEBOUT
By
Stevens, Davis, Miller + Mosher
his ATTORNEYS Patented May 1, 1951

2,551,038

UNITED STATES PATENT OFFICE 2,551,038

TIRE VALVE

Noël J. Nebout, Montluçon, France, assignor to Societe Anonyme des Pneumatiques Dunlop, Paris, France, a company of France Application December 27, 1948, Serial No. 67,413
In France April 13, 1948

6 Claims. (Cl. 152—415)

The present invention relates to a valve device comprising a long supple hose allowing easy access to the valve itself for inflating or deflating, whatever the kind of tyre or wheel, even in the case of twin wheels, and presenting a relatively low cost price as well as offering satisfactory operation safety.

The supple hose which may be connected, at one end, to the inner tube of the tyre, carries, at its free end, the valve itself, said hose being relatively long, of the magnitude of the width of a tyre, and being at least partly made of thick reinforced rubber.

In the device according to the invention the supple hose duct is provided with a complex reinforcement made, on the one hand, of a spiral wire wound around the inner surface of the supple hose duct and on the other hand, of a threadlike solid or hollow core whose diameter is smaller than the inner diameter of the supple hose duct.

In the accompanying drawing given by way of example, Fig. 1 is a perspective view, with partial sections, of an embodiment of the device according to the invention.

Fig. 2 shows, on a larger scale, a section of a portion of the supple hose.

Figs. 3, 4 and 5 are partial sections showing the various stages in fixing the valve to the rubber hose.

Hose 1 whose thick walls are made of rubber or elastic substance wrapping embedded reinforcement 2 made of textile or metal, carries at one end a circular flange 3 integral with the hose and in which the wires of reinforcement 2 spread out, as shown in 2a. Flange 3 moreover wraps a small flange 2b made of metal or other hard substance and forming the end of the central duct of hose 1.

Flange 3 is designed to be stuck and vulcanised on the inner tube of the tyre, a portion of which is shown in 4.

At its opposite end, supple hose 1 is fixed to the valve ferrule 37 by means hereunder described.

Hose 1 whose inner duct connects the inner tube to valve ferrule 37, for inflating or deflating said inner tube, carries inside this duct, a complex reinforcement made, on the one hand, of a metal or plastic wire wound in adjacent whorls on the inner surface of the duct, and on the other hand, of a metal or plastic core 51 within said duct, inside sheath 50, the thickness or the diameter of this core being small enough to leave between it and the inner wall of the duct, a section large enough for air to pass through. Metal flange 2b at the foot of the valve is used as seating for the end of adjacent whorl metal sheath 50, thus preventing the point of the wire of the last whorl of sheath 50 from piercing the rubber. Core 51 may be solid or hollow. Its end 51a next to the inner tube is free but rounded. It is fastened through its end next to the valve ferrule. For this purpose, it carries at this end, a thin member 52 laid across a diameter, said member being squeezed between the end of spiral sheath 50 and a shoulder 53 of the valve ferrule. End 51a may also be laterally fixed to small metal flange 2b instead of being free, as in the case of the drawing. However, this arrangement is less convenient as will be shown later.

In known valve hoses whose core is made of a brass tube, there is an inconvenience due to the fact that the tubular core may break after a certain time of use, owing to alternate flexions, thus allowing air pressure to be directly exerted on the rubber of the supple hose. This may entail burstings of the hose, further facilitated by the toothed or sharp edges of the broken ends of the inner metal tube which are liable to tear the rubber.

To this respect the provision according to the invention, of an inner reinforcement comprising a wire made of metal or other hard substance, spirally wound in adjacent whorls, presents the advantage of being very supple and highly resistant to alternate flexions. Besides, this reinforcement prevents the obturation of the inner duct during the bending of the supple hose. Breakings of this metal core are not to be feared in use, so that rubber is well protected against pressure stress. Moreover, the threadlike reinforcement made, for instance of malleable metal, being able to keep any given bent shape, offers the advantage of giving the supple hose the most convenient shapes for use.

The adjacent whorl reinforcement protects the rubber in case the wire breaks, by preventing the sharp edges of the breaking section from coming into contact with rubber. The combination of both reinforcements thus provides a very important technical result.

The connection of the free end of supple hose 1 to the valve itself, after having given the hose an appropriate length, is carried out thus (Figs. 3 to 5):

To begin, a nut 35 is screwed on the rubber whose surface has previously been lubricated, this nut having an inner threading 36 specially adapted to bite the rubber and carries, for this purpose, large threads of relatively important protrusion whose outline is preferably formed of portions of circles. This nut may thus be set in position in a very stable way over the rubber. Screwing is stopped when the rubber projects beyond the rear edge of the nut by 1 millimetre (see Fig. 4). After that the threadlike core 51 is introduced into the rubber hose until the head 52 of the said core comes into abutment against the first whorl of the spiral reinforcement 50. After that the ferrule 37a of the metal tube 37 enclosing in 38 the usual valve mechanism is engaged, between the spiral 50 and rubber 1, as shown on Fig. 4. This ferrule preferably ends in a thin edge 39 facilitating this engagement and may comprise a set of notches such as 40 for securing the rubber. Introducing said ferrule between spiral 50 and rubber 1 is completed by screwing on an outer threading 41 of nut 35, another nut 42 which is liable to freely turn around tube 37 and which adjusts the required driving of ferrule 37a by resting against a flange 43 of said tube 37.

When operation is ended, the various members occupy the position shown on Fig. 1. Rubber 1 which is relatively thick, is seen to be held perfectly tight between ferrule 39—40 of valve tube 37 and nut 35. This clamping provides a good air-tightness and prevents an immoderate wrenching of valve tube 37.

This tube may externally be provided with a threading 44 enabling to screw on it a nut 45 designed to hold the valve tube in a convenient position, on a support member such as 48 which may be provided on the wheel at an appropriate point for the valve to be easily reached. This member 48 may be made of metal or elastic substance such as rubber associated or not to metal. For instance, member 48 may comprise a metal portion held tight under one of the fixing nuts of the wheel and ending in a strip of elastic substance on which is fixed the valve ferrule.

The use of such a strip of elastic substance for fixing the ferrule, offers the advantage of shielding hose 1 and the inner tube from reactions taking place during a bursting and which are liable, in the case of a stiff fixing of the ferrule, to overstrain the inner tube and to damage it.

The fixing of threadlike core 51 only through its end next to the valve, as shown on Fig. 1, is convenient for the following reasons:

It is known that when, owing to an air leakage out of the inner tube, the tyre turns on the rim of the wheel, the inner tube is dragged along. If the valve is stiff (or made of a metal hose sheathed with rubber), the inner tube gets torn for it is attached to the rim through its valve. On the contrary, if the valve, according to the invention, is made of a relatively supple rubber hose and a supple complex inner reinforcement it is noticed that the inner tube is not damaged when the tyre turns on the rim. The valve yields, that is to say the rubber hose is cut and the threadlike inner reinforcement which is not fixed to the inner tube, remains integral with the valve ferrule fixed to the wheel. Resulting damages are easily repaired since it is enough to recuperate the valve ferrule and to fit it on the end of the portion of rubber hose which has remained attached to the inner tube.

The outer surface of supple hose 1 may be protected by a wire spirally wound around said surface.

What I claim is:

1. A tyre-valve device comprising a valve, a valve ferrule, to which is secured a long supple hose having a thick rubber wall, said rubber wall having a supple reinforcement embedded therein, a metal spiral wire reinforcement wound around the inner surface of said supple hose, said spiral wire containing a threadlike core of smaller diameter fixed only at one end to said rubber hose through said valve ferrule, and a sealing member connecting the portion of the hose opposite to the valve with an inner tube of a tyre.

2. A tyre-valve device comprising a valve, a valve ferrule ending in a stiff tube, a long supple hose internally secured to the external face of said stiff tube through a nut, said nut having an inner threading biting and being screwed on the supple hose and an outer threading, a second nut being in threaded engagement with said outer threading, a metal spiral wire reinforcement wound around the inner surface of the supple hose, said spiral wire containing a threadlike core of smaller diameter fixed only at one end to said rubber hose through said valve ferrule, and a sealing member for connecting the portion of the hose opposite to the valve with an inner tube of a tyre.

3. A tyre-valve device according to claim 2, wherein the end of the stiff tube of the valve ferrule is tapered and engages between the supple hose and the threadlike core.

4. A tyre-valve device according to claim 2, wherein the end of the stiff tube of the valve ferrule is provided with notches for securing the rubber.

5. A tyre-valve device according to claim 2, wherein the stiff tube of the valve ferrule is provided with a flange, and said second nut bears on said flange.

6. A tyre-valve device according to claim 2, wherein the stiff tube of the valve ferrule is provided with an external threading receiving a nut, said nut tightening the stiff tube against a fixing member integral with a wheel.

NOËL J. NEBOUT.

REFERENCES CITED

The following references are of record in the file of this patent:

UNITED STATES PATENTS

| Number | Name | Date |
|---|---|---|
| 1,555,049 | Williams | Sept. 29, 1925 |
| 2,158,576 | Glassley | May 16, 1939 |
| 2,211,063 | Kowalkiewicz | Aug. 13, 1940 |

FOREIGN PATENTS

| Number | Country | Date |
|---|---|---|
| 443,813 | Great Britain | 1936 |